United States Patent [19]

Elges, III

[11] 3,877,932

[45] Apr. 15, 1975

[54] PRESSURE CEMENTATION PROCESS FOR RECOVERY OF COPPER FROM SOLUTION

[75] Inventor: Carl H. Elges, III, Reno, Nev.

[73] Assignee: The United States of America as represented by the Secretary of the Interior, Washington, D.C.

[22] Filed: Feb. 21, 1974

[21] Appl. No.: 444,575

[52] U.S. Cl. .................... 75/109; 75/.5 A; 75/117
[51] Int. Cl. ............................................. C22b 15/12
[58] Field of Search ............ 75/117, 109, 108, .5 A

[56] References Cited
UNITED STATES PATENTS

| | | | |
|---|---|---|---|
| 2,813,020 | 11/1957 | Van Hare | 75/109 |
| 3,810,971 | 5/1974 | Skarbo et al. | 75/117 X |
| 3,816,105 | 6/1974 | McKay et al. | 75/117 X |

*Primary Examiner*—G. Ozaki
*Attorney, Agent, or Firm*—Roland H. Shubert; Gersten Sadowsky

[57] ABSTRACT

Copper is recovered from acidic aqueous solutions containing cupric, ferric, ferrous and other ions by a cementation reaction with elemental iron. The cementation step is performed under hydrogen pressure which minimizes iron consumption and allows the cementation treatment of highly acidic solutions.

6 Claims, No Drawings

PRESSURE CEMENTATION PROCESS FOR RECOVERY OF COPPER FROM SOLUTION

BACKGROUND OF THE INVENTION

It has long been the practice to precipitate copper from solution by bringing the solution into contact with a metal which is higher in the electromotive series than copper. Iron is most commonly used as the precipitating metal. The largest commercial application of cementation technology is in the recovery of copper from solutions obtained in the leaching of copper ores; especially oxide ores and those sulfide ores having too low a copper content to be economically processed using conventional beneficiation techniques. Almost without exception, these leaching operations are based upon the dissolution of copper minerals in solutions containing sulfuric acid.

The leach solution, pregnant with copper, is brought into contact with metallic iron to precipitate a copper product. The copper product is called cement copper and typically assays 70 to 90% elemental copper. Precipitation conventionally takes place at ambient pressure in gravity launders or cone precipitators wherein dissolved copper sulfate reacts with elemental iron to form elemental copper and ferrous sulfate. Leach solutions almost invariably contain free sulfuric acid. This acid also reacts with iron to produce ferrous sulfate and hydrogen. Any ferric iron present also reacts with elemental iron to form additional ferrous sulfate. Iron utilized in the precipitation reaction is generally in the form of burned, detinned, shredded scrap cans. Other forms of iron including scrap punchings, clippings and sponge iron are also used.

Conventional cementation technology dictates that a copper leaching operation be carefully controlled to produce an influent solution to the precipitator having a pH in a range of about 1.5 to 3.0. Solutions having a pH below about 1.5 contain such excessive amounts of free acid that iron consumption becomes an obvious economic deterrent. The pH cannot be allowed to exceed about 3.0 because above this acidity level iron salts will begin to form and may precipitate in pipelines or within the leaching site. Iron salt precipitation within the ore being leached results in the formation of impervious layers which prevent the movement of leached solutions. Hence, copper bearing minerals which are coated with precipitated iron salts have no contact with leach solutions and their copper content cannot be recovered. To complicate the situation further, oxidation of ferrous iron to ferric iron is favored by higher pH values. This results in higher iron consumption due to the reaction of ferric iron with the elemental iron. The problems enumerated above make control of acidity a very complex problem; hence the functioning of a copper leaching operation is severely limited by the constraints imposed by conventional cementation technology.

SUMMARY OF THE INVENTION

I have found the use of a hydrogen over pressure during the precipitation of copper from acidic solutions by cementation using elemental iron allows the treatment of solutions of much higher acidity without undue iron losses. A hydrogen pressure of about 50 psi or more is required for efficient operation. It is preferred that the reaction be carried out at ambient temperature but higher temperatures may be used as well.

At least 4 advantages are inherent in the utilization of my process.

1. Iron consumption due to reaction with acid is reduced.
2. Substantially smaller amounts of iron compounds are generated in the cementation step.
3. Hydrogen produced during the reaction may be conveniently recovered.
4. Substantially higher acid concentrations can be utilized both in the leaching and cementation steps of my process than are feasible when using conventional techniques.

Hence it is an object of my invention to minimize the consumption of the precipitating metal in a cementation reaction.

A specific object of my invention is to efficiently precipitate copper from highly acidic solutions by a cementation process using iron as the precipitating metal.

DETAILED DESCRIPTION OF THE INVENTION

Copper bearing solutions are generally obtained from dump, heap, in situ, or vat leaching operations. All of these operations are based upon a dissolution of copper minerals in solutions containing sulfuric acid. The resulting copper bearing leach solution normally contains cupric, ferrous, ferric, sulfate and other ions in solution. Precipitation of the copper from the acidic, pregnant leach solution conventionally is accomplished at ambient pressure and temperature in gravity launders or cone precipitators. Metallic iron is most commonly used as the precipitating metal. Metallic iron precipitates copper from solution according to the following reaction:

$$CuSO_4 + Fe \rightarrow Cu + FeSO_4$$

In theory, this equation dictates that 0.88 pounds of iron will be consumed in the precipitation of 1 pound of copper. In practice, the weight of iron required to precipitate 1 pound of copper is substantially in excess of that theoretically required. A ratio of pounds of iron consumed per pound of copper precipitated is called the can factor. Conventional precipitators operate at can factors of between about 1.2 and 2.5. This variance between theory and practice is due to iron losses incurred in the following competing reactions:

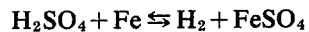
$$H_2SO_4 + Fe \leftrightarrows H_2 + FeSO_4$$

and

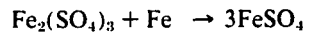
$$Fe_2(SO_4)_3 + Fe \rightarrow 3FeSO_4$$

These two equations represent reactions responsible for consumption of iron without the concomitant production of copper. Reaction of iron directly with sulfuric acid, as expressed in the first equation, has a certain beneficial effect in that evolution of hydrogen gas bubbles result in the spalling of copper from the surfaces of iron particles thus continuously exposing new reaction surfaces. If the leach solution is highly acidic, however, the amount of iron lost though this reaction quickly becomes uneconomic.

Consumption of iron by the second reaction, that is the reaction of ferric sulfate with iron to form ferrous sulfate, is strongly dependent upon the ferric iron concentration of the pregnant leach solution as well as its pH. The rate of oxidation of ferrous to ferric iron by atmospheric oxygen increases rapidly with an increase in the solution pH. Iron losses attributable to this reaction are minimized by conducting the cementation reaction at high acidity levels.

I have found that I can counteract the effects of these unfavorable reactions by conducting the cementation step under a hydrogen pressure. A hydrogen pressure acts to shift the equilibrium of the acid-iron reaction such that iron consumption is substantially reduced. By taking advantage of this fact, I can operate a copper leaching circuit utilizing much higher acidities without excessive iron consumption in the precipitators. Furthermore, much faster extraction of copper values can be achieved than is presently possible. Also some ores which formerly could not have been treated economically because of restrictions on leach solution acidity imposed by conventional cementation technology can now be exploited economically. An example of one such ore is chrysocolla present in a finely disseminated form in a refractory matrix.

My process is applicable to the treatment of those leach solutions now subjected to conventional cementation technology. Greatest benefits, however, will be obtained in the treatment of much more highly acidic leach solutions having a free acid in the general range of about 2 to 10 weight percent. This acid concentration corresponds to a pH substantially below 1. Hydrogen pressures required for the efficient operation of my process range between about 50 and 500 pounds per square inch. A preferred hydrogen process is in the range of about 100 to 300 psi. I prefer to operate the process at the ambient temperature of the influent solution which is generally in the range of about 35 to 95°F in the continental United States. Temperature, however, is not an important consideration and variations of temperature will not adversely affect the process. As is the case in conventional precipitators, I prefer to operate with an excess of metallic iron as the precipitating metal. The reaction itself is carried out in a closed vessel capable of containing the hydrogen pressures required. Suitable means for pumping solutions through the precipitating vessel, introducing metallic iron, and recovering cement copper are those conventionally used in the art of hydrometallurgy.

The following examples more fully illustrate and describe my invention.

EXAMPLE 1

Samples of technical grade iron powder were mixed with a substantial excess of 5% sulfuric acid, placed in an autoclave, and pressurized with hydrogen gas. The mixture was then reacted with agitation for 1 hour at ambient temperatures. Pressures were recorded before and after each run. At the end of the one-hour reaction time the autoclave was depressurized and the mixture remaining was filtered and the metal recovered was dried with acetone and weighed. Tabulated results are as follows:

Table 1

| Run No. | Pressure, psig $H_2$ Before | After | Weight loss, pct |
|---|---|---|---|
| 1 | 0 | 0 | 18.0 |
| 2 | 50 | 64 | 14.6 |
| 3 | 100 | 112 | 9.1 |
| 4 | 150 | 157 | 4.6 |
| 5 | 200 | 203 | 1.2 |
| 6 | 250 | 250 | 1.2 |

These tests illustrate that the kinetics of iron reacting with sulfuric acid are substantially affected by operating pressure. As is evident from the data, iron consumption at 200 psig hydrogen pressure was less than 10% of that consumed at ambient pressure.

EXAMPLE 2

Two samples of technical grade iron powder were placed in reaction vessels with a 5% solution of sulfuric acid containing 2 grams per liter of copper as the sulfate. Iron was present in each sample in a weight ratio 10 times that of the copper. One vessel was pressurized to 200 psig hydrogen pressure; the other was left at ambient pressure. Temperature was ambient and the reaction were stirred intermittently. Reaction times were two hours in each case. At the end of the runs the contents of the reaction vessels were filtered and the metal was acetone dried and weighed. Results are as follows:

Table 2

| Hydrogen pressure psig | Cu precipitated % | Fe consumed % | Can Factor |
|---|---|---|---|
| 0 | ~100 | 74.9 | 7.49 |
| 200 | ~100 | 34.2 | 3.42 |

A sulfuric acid concentration of 5% corresponds to a pH value of approximately 0.3. Iron was present in these experiments in a substantially greater excess than would be used in commercial practice and the reaction time was longer than that necessary to carry the precipitation reaction to substantial completion. Comparison of the two runs demonstrates that precipitation under substantial hydrogen pressure is not only feasible but also results in a much lower iron consumption.

EXAMPLE 3

Technical grade iron powder was placed in an autoclave and mixed with a 5% solution of sulfuric acid containing 2 grams per liter of copper as the sulfate. In this experiment, the weight ratio of iron to copper was 1 to 2. The reaction vessel was pressurized with hydrogen to 200 psig, agitated, and allowed to react for 1 hour at ambient temperature. At the end of the run the pressure was released, the solution was filtered and the metal which was recovered was acetone dried, weighed and analyzed. The cement copper product assayed 81% metallic copper and the can factor for the precipitation reaction was 1.57. This experiment demonstrates that it is possible to produce cement copper of adequate grade from solutions of high acidity at economically realistic can factors.

EXAMPLE 4

A solution of 5% sulfuric acid containing 2 grams per liter of copper as the sulfate was placed in an autoclave and pressurized with hydrogen to 250 psig. The mixture was reacted for 2 hours with agitation at ambient temperatures. At the end of this time the autoclave was depressurized and its contents were inspected. No copper had precipitated. This experiment demonstrates that there is no reduction of copper by hydrogen during the cementation reaction.

These examples are for the purpose of more fully describing and illustrating my invention. Minor variations and changes will be obvious to those skilled in the art.

I claim:
1. A process for precipitating copper values from an acidic leach solution containing cupric, ferric, ferrous and sulfate ions which comprises:
   contacting the solution with metallic iron in a closed vessel under a hydrogen pressure of at least 50 psi for a time sufficient to precipitate at least a major portion of the copper from the solution, and
   separating the precipitated copper from the copper-depleted solution.
2. The process of claim 1 wherein the free acid content of the leach solution is in the range of 2 to 10%.
3. The process of claim 2 wherein the hydrogen pressure within the closed vessel during the precipitation reaction is in the range of 100 to 300 psi.
4. The process of claim 3 wherein metallic iron is present in stoichiometric excess over that theoretically required to react with all of the copper contained in the leach solution.
5. The process of claim 4 wherein the precipitation reaction is performed at ambient temperature.
6. The process of claim 4 wherein the leach solution is agitated during the precipitation reaction.

* * * * *